United States Patent
Harris et al.

(10) Patent No.: US 11,914,739 B2
(45) Date of Patent: *Feb. 27, 2024

(54) RANDOMNESS DETECTION IN NETWORK DATA

(71) Applicant: International Business Machines Corporation, Armonk, NY (US)

(72) Inventors: Bradley E. Harris, Sandy Springs, GA (US); Moazzam Khan, Marietta, GA (US); James Brent Peterson, Atlanta, GA (US)

(73) Assignee: International Business Machines Corporation, Armonk, NY (US)

(*) Notice: Subject to any disclaimer, the term of this patent is extended or adjusted under 35 U.S.C. 154(b) by 276 days.

This patent is subject to a terminal disclaimer.

(21) Appl. No.: 17/396,724

(22) Filed: Aug. 8, 2021

(65) Prior Publication Data

US 2021/0374272 A1    Dec. 2, 2021

Related U.S. Application Data

(63) Continuation of application No. 16/375,914, filed on Apr. 5, 2019, now Pat. No. 11,151,275.

(51) Int. Cl.
*H04L 29/06* (2006.01)
*G06F 21/62* (2013.01)
(Continued)

(52) U.S. Cl.
CPC ........ *G06F 21/6227* (2013.01); *G06F 21/602* (2013.01); *H04L 9/008* (2013.01);
(Continued)

(58) Field of Classification Search
CPC ... G06F 21/6227; G06F 21/602; H04L 9/008; H04L 9/0656; H04L 63/0428; H04L 63/1475
See application file for complete search history.

(56) References Cited

U.S. PATENT DOCUMENTS 7,508,945 B1    3/2009  Herrero
8,306,942 B2   11/2012  Chen et al.
(Continued)

FOREIGN PATENT DOCUMENTS

CN    101888282 B    11/2012
CN    105915555 B     2/2020
KR    100866984 B1   11/2008

OTHER PUBLICATIONS

Leydold; "rvgtest Error Detection in Non-Uniform Random Variate Generators"; Version 0.7.4; Feb. 26, 2014; pp. 1-21.
(Continued)

*Primary Examiner* — Malcolm Cribbs

(57) ABSTRACT

An example operation may include one or more of dividing a data file into a plurality of data chunks, generating a randomness value for each data chunk based on one or more predefined randomness tests, and accumulating generated randomness values of the plurality of data chunks to generate an accumulated randomness value, detecting whether the data file is one or more of encrypted and compressed based on the accumulated randomness value and a predetermined threshold value, and storing information about the detection via a storage.

21 Claims, 7 Drawing Sheets

(51) Int. Cl.
  *G06F 21/60* (2013.01)
  *H04L 9/40* (2022.01)
  *H04L 9/06* (2006.01)
  *H04L 9/00* (2022.01)

(52) U.S. Cl.
  CPC ........ *H04L 9/0656* (2013.01); *H04L 63/0428* (2013.01); *H04L 63/1475* (2013.01)

(56) References Cited

U.S. PATENT DOCUMENTS

| | | | |
|---|---|---|---|
| 8,341,724 B1* | 12/2012 | Burns | H04L 69/22 709/224 |
| 2002/0035628 A1 | 3/2002 | Gil et al. | |
| 2003/0058863 A1 | 3/2003 | Oost | |
| 2004/0196970 A1 | 10/2004 | Cole | |
| 2007/0223706 A1* | 9/2007 | Gantman | G06F 21/602 380/286 |
| 2010/0058049 A1 | 3/2010 | Fein et al. | |
| 2012/0124375 A1 | 5/2012 | Truskovsky et al. | |
| 2013/0279404 A1 | 10/2013 | Mazurenko et al. | |
| 2014/0164785 A1 | 6/2014 | Ochiai et al. | |
| 2016/0192398 A1 | 6/2016 | Wang et al. | |
| 2019/0005235 A1 | 1/2019 | Klonowski et al. | |
| 2019/0068362 A1 | 2/2019 | Anderson et al. | |

OTHER PUBLICATIONS

List of IBM Patents or Patent Applications treated as related, Sep. 12, 2021.
Bradley E. Harris et al., Randomness Detection in Network Data, U.S. Appl. No. 16/375,914, filed Apr. 5, 2019.

* cited by examiner

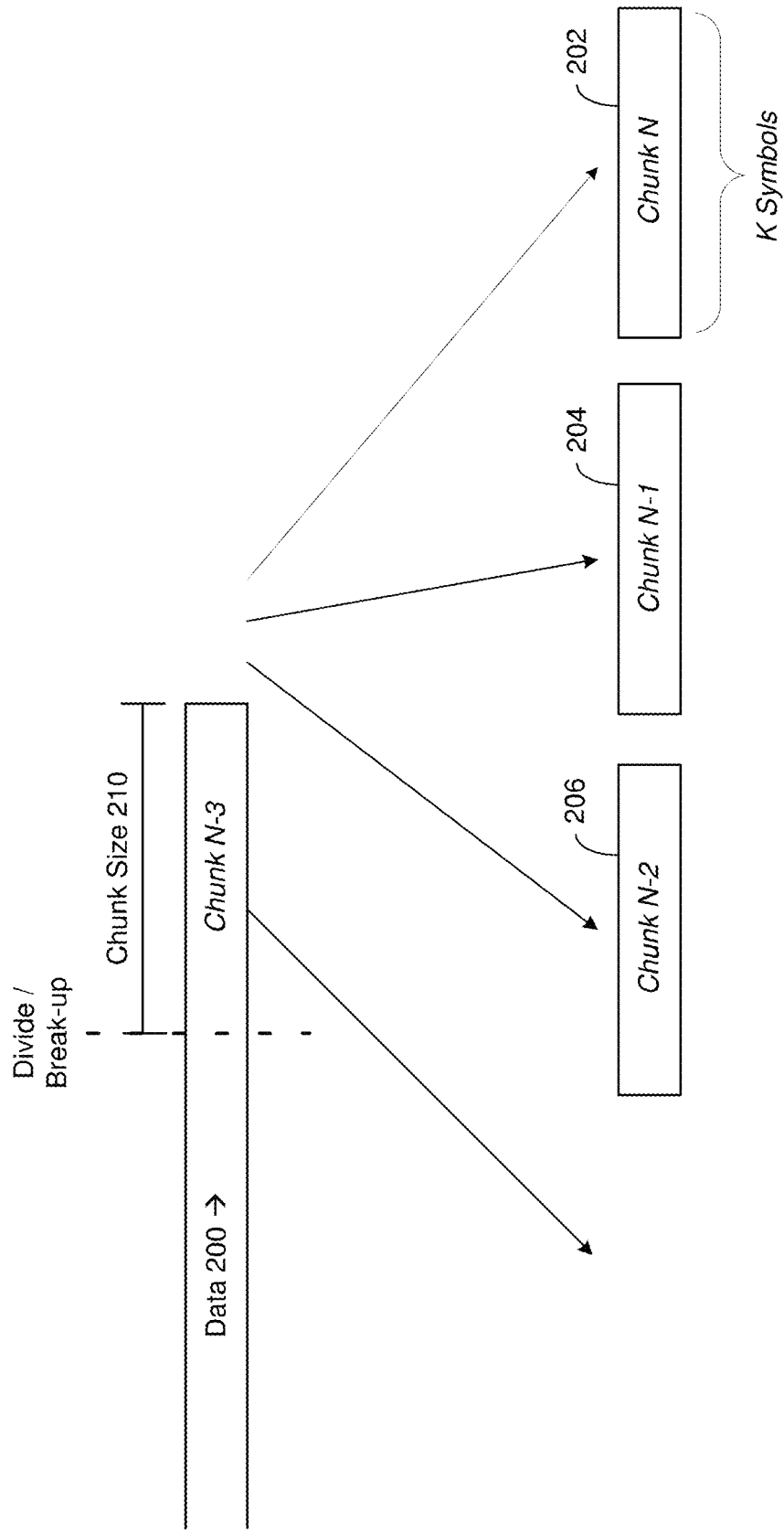

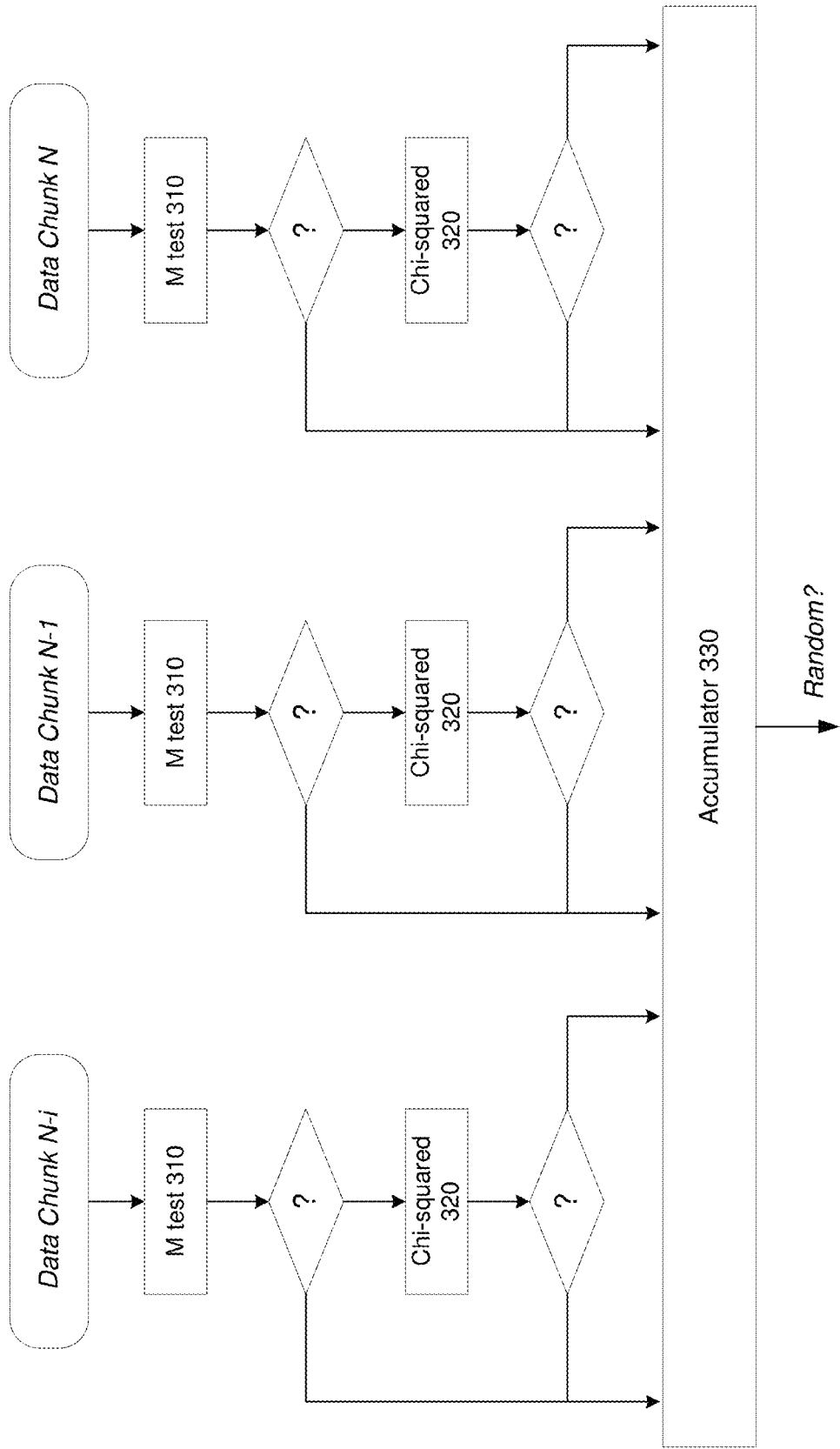

RANDOMNESS DETECTION IN NETWORK DATA

TECHNICAL FIELD

This application generally relates to a security system capable of identifying random data, and more particularly, to a security system which can detect whether a data file or incoming network traffic is encrypted or compressed.

BACKGROUND

A cryptographic system (or a cipher system) is a method of hiding data so that only certain people can view it. The original data is often referred to as plaintext while the protected data is referred to as ciphertext. Encryption is a procedure to convert plaintext into ciphertext and decryption is a procedure to convert ciphertext into plaintext. A cryptographic system typically consists of algorithms, keys, and key management facilities.

Modern cryptography is the practice of converting a readable data file (message, stream, etc.) into an unintelligible one with the ability to convert the data file back into a readable format. The practice of cryptography is becoming increasingly important as computer systems become more complex. The skills needed to implement cryptography within modern computer systems is deeply rooted in the computer science discipline.

The foundational pillars of cryptography include confidentiality, non-repudiation, integrity and authentication. Confidentiality means that no one else besides the intended data recipient is able to decipher the data transferred on the computer's network equipped with cryptographic tools. The nature of cryptography allows for the identification of users that access a computer network or that transmit data on the network. This non-repudiation eliminates the ability of people to deny their actions on computer network systems. Authentication ensures that the identity of the sender and receiver of a message or those accessing computer networks are known. This is also the basis for electronic signatures which uses a type of cryptography known as public key. Protecting the integrity of the computer network and its transmitted data is one of the most important functions of cryptographic systems. Integrity of the data ensures that it has not been altered between sender and receiver.

Modern cryptographic protocols often require frequent generation of random quantities. Cryptographic attacks that subvert or exploit weaknesses in this process are known as random number generator attacks. A high quality random number generation (RNG) process is almost always required for security, and lack of quality generally provides attack vulnerabilities and so leads to lack of security, even to complete compromise, in cryptographic systems. The RNG process is particularly attractive to attackers because it is typically a single isolated hardware or software component easy to locate. If the attacker can substitute pseudo-random bits generated in a way they can predict, security is totally compromised, yet generally undetectable by any upstream test of the bits. As such, what is needed is a mechanism for identifying potential random number generation attacks.

SUMMARY

One example embodiment may provide a system that includes a processor and a storage, where the processor may be configured to divide a data file into a plurality of data chunks, generate a randomness value for each data chunk based on one or more predefined randomness tests, accumulate generated randomness values of the plurality of data chunks to generate an accumulated randomness value, and detect whether the data file is one or more of encrypted and compressed based on the accumulated randomness value and a predetermined threshold value, and the storage may be configured to store information about the detection via a storage.

Another example embodiment may provide a method that may include dividing a data file into a plurality of data chunks, generating a randomness value for each data chunk based on one or more predefined randomness tests, and accumulating generated randomness values of the plurality of data chunks to generate an accumulated randomness value, detecting whether the data file is one or more of encrypted and compressed based on the accumulated randomness value and a predetermined threshold value, and storing information about the detection via a storage.

Another example embodiment may provide a system that includes a processor and a storage, where the processor may be configured to divide a stream of network traffic into a plurality of data chunks, generate a randomness value for each data chunk based on one or more predefined randomness tests, and accumulate generated randomness values of the plurality of data chunks to generate an accumulated randomness value, and detect whether the network traffic is one or more of encrypted and compressed based on the accumulated randomness value and a predetermined threshold value, and the storage may be configured to store information about the detection of the network traffic.

Another example embodiment may provide a method that may include dividing a stream of network traffic into a plurality of data chunks, generating a randomness value for each data chunk based on one or more predefined randomness tests, and accumulating generated randomness values of the plurality of data chunks to generate an accumulated randomness value, detecting whether the network traffic is one or more of encrypted and compressed based on the accumulated randomness value and a predetermined threshold value, and storing information about the detection of the network traffic.

A further example embodiment may provide a non-transitory computer readable medium comprising instructions, that when read by a processor, may cause the processor to perform dividing a stream of network traffic into a plurality of data chunks, generating a randomness value for each data chunk based on one or more predefined randomness tests, and accumulating generated randomness values of the plurality of data chunks to generate an accumulated randomness value, detecting whether the network traffic is one or more of encrypted and compressed based on the accumulated randomness value and a predetermined threshold value, and storing information about the detection of the network traffic.

BRIEF DESCRIPTION OF THE DRAWINGS

FIG. 2 is a diagram illustrating a process of chunking data for randomness evaluation according to example embodiments.

FIG. 3B is a diagram illustrating an accumulator for aggregating randomness values for a plurality of data chunks according to example embodiments.

DETAILED DESCRIPTION

Figure 1A:
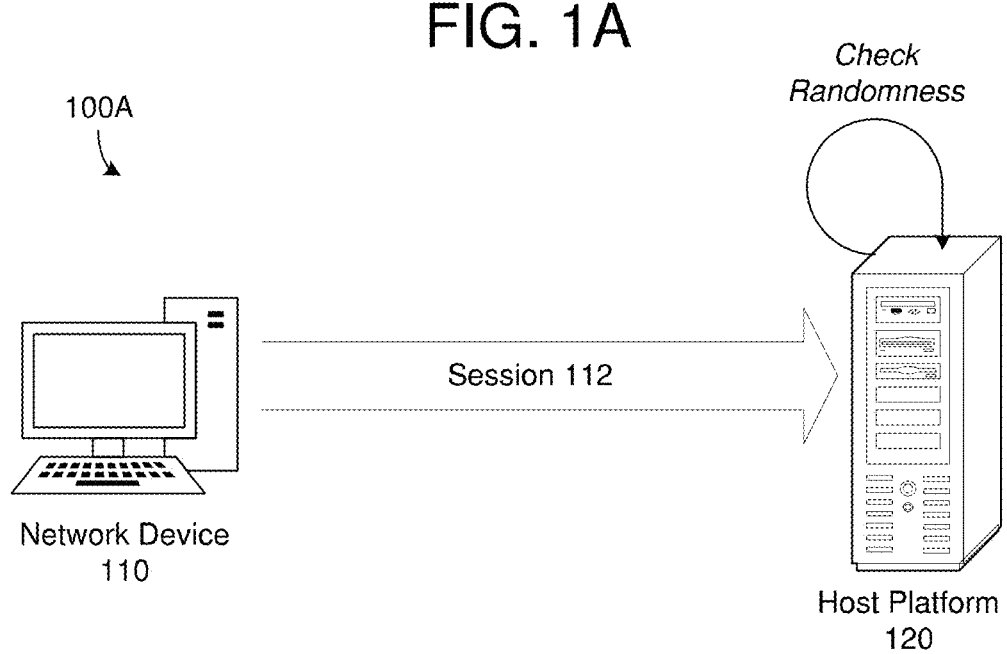
FIGS. 1A-1B are diagrams illustrating a system for random number generation (RNG) detection according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The example embodiments are directed to a system and method that can detect pseudorandom and random symbol generation algorithms such as strong encryption algorithms and strong compression algorithms. Rather than analyze a file or stream of data as a whole, the system uses small sequences (data chunks), which are then collected to give a total evaluation of the traffic, file, or other data.

Entropy is a measure of the number of smaller symbols (such as bits) that are required to understand a larger symbol (such as a byte). For example, entropy can indicate how many bits on average are required to describe and recover a byte. Intuitively, a good compression should have a high entropy because more information is "packed" into a smaller amount of space. So, more bits are required to recover the original uncompressed data. In the case of encryption, ideally the so-called "plaintext" has been scrambled into "ciphertext" in such a way that without the key it should be impossible to recover the plaintext from the ciphertext. In this case, if this property holds, the entire byte or block is required in order to decrypt the ciphertext back into plaintext. So, like compression, more bits of the byte are required to understand the original data.

However, contrary to this notion, entropy fails to be a reliable indicator of a data file/stream that has been subject to encryption or compression. The problem is that compression and encryption algorithms are very sensitive to their inputs, and compression more so than encryption. In point of fact, strong encryption algorithms should be input agnostic. If an encryption algorithm proves to be overly sensitive to its input then it is not cryptographically strong. Also, many plaintext or uncompressed samples of data have very high entropy. For example, there are HTML pages with an entropy of 7.6 or so, which is the same value shown by, for example, a compression algorithm with English input. With encryption, the algorithms produced wildly different entropies, some as low as 7.4. Therefore, entropy itself proves to be very unreliable. In order to identify encrypted or compressed data several "holes" had to be created in the entropy detector's detection ranges, making it useless in the generic sense. Also, the statistic is typically calculated over the entire data, which makes it sensitive to changes in the entropy of "chunks" of data.

The example embodiments overcome these drawbacks through the use of a chunking process which takes a data file or data stream and divides it into smaller pieces. Each chunk may be individually evaluated for randomness using one or more predefined tests for randomness. As described herein, the randomness tests may include the Fuchs and Kenett M test (m test) and/or the chi-squared test. Each test can identify whether the data chunk consists of random data or non-random data. The system can create a value (e.g., +1 or −1, etc.) depending on whether a chunk is random or not random. The system can accumulate these values across a minimum threshold of chunks (e.g., 21 chunks, etc.) to generate an accumulated/aggregate random value for the data file. The accumulated random value can be compared to a predetermined threshold to determine whether the data file is random (and likely encrypted or compressed).

Some of the benefits of such a system as described herein include breaking-up (chunking) data samples (files, streams, etc.) into pieces of a predetermined size and then performing one or more randomness tests (e.g., M test and chi-squared test) on the chunks. The system uses an accumulator to keep track of how many chunks were evaluated as random or non-random and can use this accumulation to make a decision as to whether the input data sample is compressed or encrypted (and possibly malicious). The system can acquire the data samples directly on the data rather than through frequencies of a histogram. Furthermore, the system can can detect randomness on network traffic as well as on static files.

The random detection performed by the example embodiments may be incorporated into various applications. For example, on the network it can be used to detect an encrypted malware command (or other malicious command/request). Here, the algorithm may detect non-standard command and control communications for malware such as botnets, RATs (Remote Administration Tools), or the like. As another example, the system can be used to identify users that are going through a Tor session. Tor sessions enable users to surf the Internet, chat and send instant messages anonymously, etc., and is often used for illicit purposes. The system can detect Tor sessions, which has been difficult if not impossible because there has been no detector like this one. For example, the system can identify/find Tor bridge servers with Tor protocols (e.g., OBFS4) rather than simply exit nodes. These Tor bridge servers are traditionally kept a secret. As another example, the system may detect/discover items such as encrypted and/or compressed JavaScript such as JavaScript which has a decoder/decompressor at the beginning to unpack the real exploit code. In each of these examples, the system may intercept the traffic and terminate the connection to stop the unwanted or malicious activity.

Figure 1B:
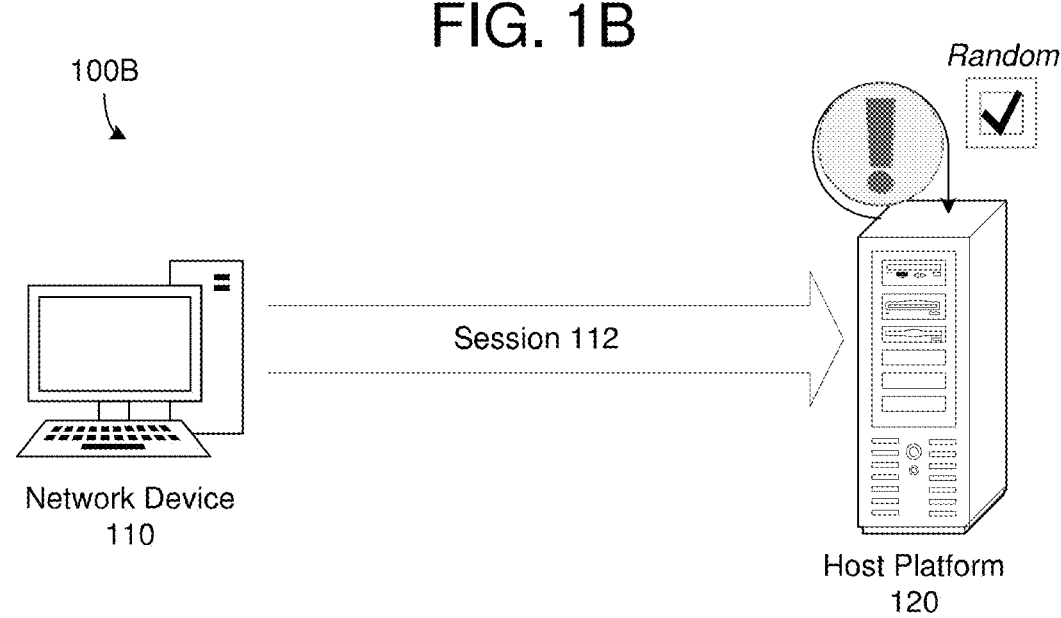

FIGS. 1A-1B illustrate examples of a system 100 for random number generation (RNG) detection according to example embodiments. Referring to the example of FIG. 1A, the system 100 includes a network device 110 such as a personal computer, a laptop, a mobile phone, a tablet, a server, a database, or the like, which transmits network traffic 112 to a host platform 120 which may be a web server, a database, a cloud platform, an email server, a messaging server, an application server, or the like. Here, the network traffic 112 may be evaluated by the host platform 120 to detect whether the network traffic 112 includes any type of random data (random, pseudo-random, etc.) which is indicative of an encrypted or compressed data session. Any network traffic can be analyzed/evaluated by the host platform 120.

Randomness and pseudo-randomness may be used interchangeably herein with pseudo-randomness being used for a purely technical difference. For example, there are very few "real" sources of randomness, so most sets of samples are actually pseudo-random. The randomness can be evaluated using predefined tests as further described herein with respect to the examples of FIGS. 3A and 3B.

In FIG. 1B, the host platform 120 detects that the network traffic 112 (data, protocol, etc.) is random based on a chunking process and evaluation as described further herein. In some embodiments, the randomness detection algorithm described herein may be part of a larger security system. When detecting that the network traffic is random, the host platform 120 may send a notification to another component of the system which can generate and output an alert to a display device such as an operator, or the like. In some embodiments, the system may terminate the connection between the network device 110 and the host platform 120 due to a likelihood that the network device 110 is a security threat. As another example, the system may generate and output a warning or some other kind of notification indicating that randomness (encryption, compression, etc.) has been identified from the traffic.

FIG. 2 illustrates a process 220 of chunking data for randomness evaluation according to example embodiments. For example, the process 220 may be performed by the host platform 120 shown in FIGS. 1A-1B, or some other entity. Referring to the example of FIG. 2, a data file, data stream, etc., (data 200) may be divided into a plurality of smaller pieces also referred to herein as data chunks 202, 204, 206, etc., based on a chunking algorithm. The chunking algorithm may be very direct. First, a chunk size (e.g., K symbols, etc.) can be chosen where a symbol may represent a byte or some other value. Here, the algorithm may read one symbol at a time currently rather than in chunks of K symbols and build each chunk.

In the example of FIG. 2, the algorithm breaks a first chunk 202 of predefined chunk size 210 (e.g., 24 bytes, 36 bytes, etc.) and stores it into a buffer. Then, as further described with respect to FIGS. 3A and 3B, the system tests the data chunk 202 for randomness/pseudo-randomness. The algorithm then stores the result in an accumulator. The algorithm then reads a next chunk 204 from the data 200 and performs the same action. The algorithm may continue to break-up chunks of data from the data 200 until a predetermined number of chunks have been created or the data file/stream is completed. In some embodiments, the trailing bytes shorter than the predefined chunk size 210 may be ignored so as not to introduce an initialization bias in the chunk testing. According to various aspects, the algorithm may evaluate a fixed static window (not sliding window).

The use of data chunks allows for a few unique operations. Firstly, the system can analyze small sets of samples. Through experimentation, it may be determined the system works best with a predetermined number of symbols (e.g., 504 symbols, etc.) or (21 chunks at 24 bytes, etc.). This number of symbols is far smaller than the usual required number of samples. Also, the chunking allows the system to analyze live network traffic. For example, rather than collect an entire message the system may evaluate chunks at a time. If the system were to collect the entire message, the message would have already gotten through (delivered) and there would be no way of stopping it. In an aggressive network setup, chunking allows for the network (host platform, etc.) to force the connection to be terminated. This is especially useful with Tor connections.

As another example, for compressed traffic, the system may not have to parse the headers of compressed streams. Instead, the system can simply analyze the stream of symbols (usually bytes) to find the compression. This saves on CPU time and memory because the system does not have to analyze the headers or decompress the file or stream until the system has detected that the stream is compressed.

Figure 3A:
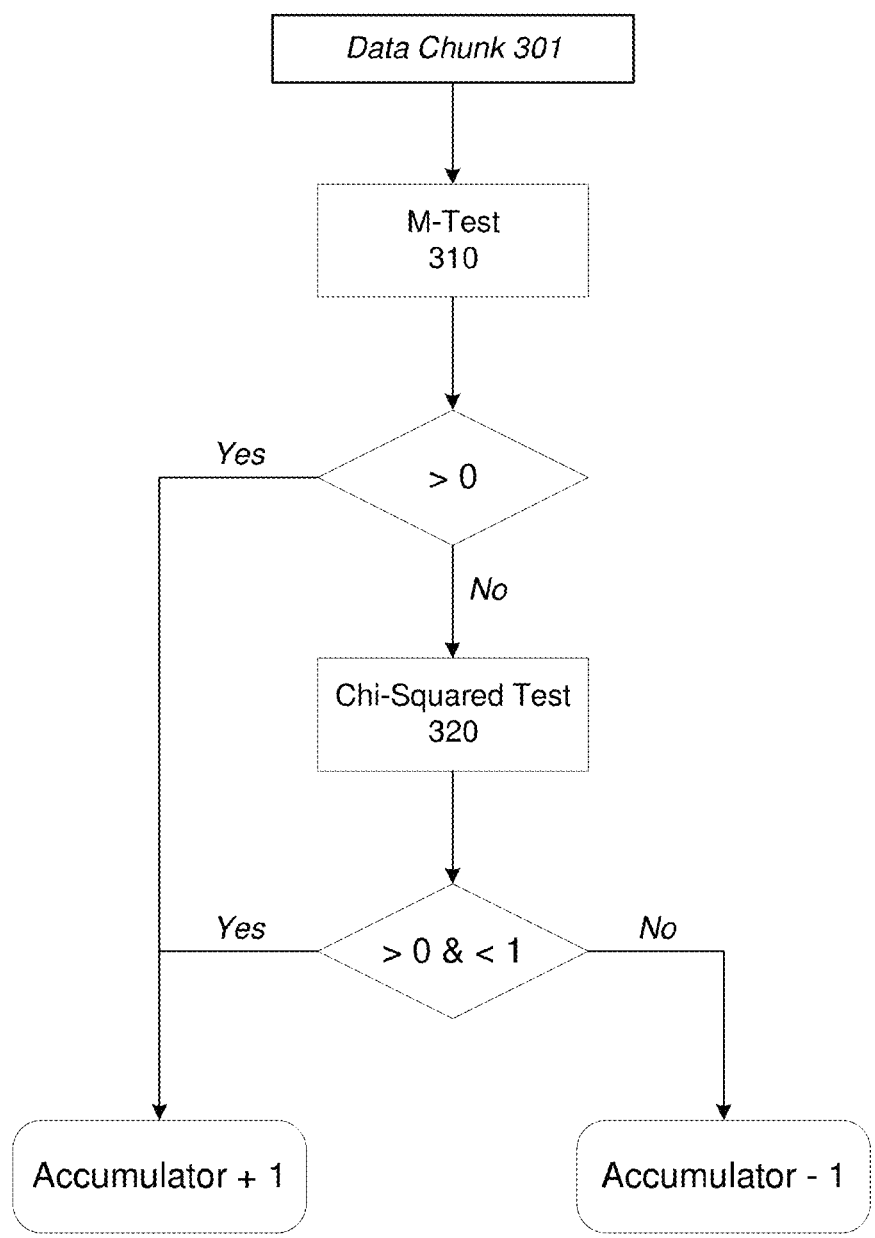
FIG. 3A is a diagram illustrating a process of testing a data chunk for randomness according to example embodiments.

FIG. 3A illustrates a process 300A of testing a data chunk for randomness according to example embodiments, and FIG. 3B illustrates a process 300B of an accumulator 330 aggregating randomness values for a plurality of data chunks which are tested via the process 300A, according to example embodiments. Referring to FIG. 3A, in order to test a data chunk 301, the system relies on two statistical tests, a chi-squared test 320 which is extremely sensitive to randomness, and a Fuchs and Kenett M test 310, which is even more sensitive to randomness. Because of its superior evaluation abilities, the m test 310 may be performed prior to the chi-squared test 320. In this case, if the m test 310 finds randomness, the chi-squared test 320 may be omitted.

In some cases, one of the tests on their own may not be deterministic enough to work a chunk of symbols (small piece of data) at a time. Rather, both tests may be performed with the chi-squared test 320 being a fallback test after the m test 310. Further, the m test 310 may be applied first because it is a better evaluator of randomness. The chi-squared test 320 may be a fallback method in case the m test finds that a chunk is not random. It is conceivable that the m test 310 can be used by itself (for example, to reduce processing time and resources), but results may not be as good.

In this example, the m test 310 is used for two tasks. Firstly, it tries to find values outside what is called a multinomial distribution. That is, it finds samples which do not fall within that pattern of samples. A distribution is a set of numbers which form a sort of shape. Each has a way that it looks on a graph, and the tests determine if the samples fall within that shape. Secondly, the m test 310 may be used to reject what is known as the null hypothesis, which means that it proves that something has an effect on the final result. The null hypothesis says that the sample is completely meaningless toward the result, and the m test 310 may be designed to reject this hypothesis. The value of the output may be greater than zero. Here, a zero value means that there is no correlation at all (i.e., the null hypothesis is true.) Different boundaries for the tests may be used. In this example, zero is used as a lower bound without an upper bound so that the system can operate on very small chunk sizes of 24 samples.

The chi-squared test 320 is similar to the M-Test 310, but instead of a multinomial distribution the chi-squared test 320 looks for values in a chi-square distribution. A distribution is a set of numbers which form a sort of shape. Each has a way that it looks on a graph, and the tests determine if the samples fall within that shape. If the null hypothesis is true, the samples will all fall inside that distribution. If it is false, there are samples which are outside of it. This therefore is another detector of randomness but based on a different distribution. In order to work on small chunk sizes, the suggested lower and upper boundaries may be set to zero and 1. The output is always between those numbers including 0 and 1. In this case, if the value is greater than 0 and less than 1, the system considers the chunk random. However, if the value equals 0 or 1 then it is not random.

Referring to FIG. 3A, both tests 310 and 320 may be applied to the small data chunk 301, and the results are accumulated. First, the Fuchs and Kenett m test 310 is applied to the chunk 301. This is the first test due to its sensitivity to randomness. To interpret this test, merely compare its result with zero. Here, if the m-test >0, then the system adds one to an accumulator value and the process 300A exits. However, if the m-test is equal to zero, the chi-squared test 320 is applied. Because of the small size, the constraints may be relaxed on the chi-squared test 320 from the typical 0.05-0.95 for randomness. Instead the test may determine randomness if the value of the chi-squared-test >0 and <1. If so, then one may be added to the accumulator value. However, if both the m test 310 and the chi-squared test 320 fail to detect randomness, the system may subtract one from the accumulator value. Accordingly, depending on the results of the two tests, the chunk 301 is detected as being random or non random, and the accumulator value is updated accordingly.

Referring to FIG. 3B, the accumulator 330 is set by looping over all chunks from a data file/stream being analyzed. In this way, the accumulator 330 aggregates randomness values determined for each chunk from among a plurality of chunks that make up a data file/stream. After aggregating the randomness values for all the chunks in the data, the aggregate randomness value is compared with a threshold value. As one example, the threshold may be set to 0, meaning that the randomness and non-randomness balance. This is what one would expect from a perfect distribution. The threshold of 0 works well in current evaluations, but it can be adjusted if the real world evaluations do not match lab testing.

There are tunable parameters to this test. Firstly, one could change the m-test comparison lower bound from 0 to a higher value if the test proves to be too sensitive. This can also be used to detect weaker encryption algorithms. For example, RC4, which is known to have several weaknesses, receives an m-test score of 0.03 to 0.04. Stronger algorithms receive higher m-test scores. Likewise the lower and upper bounds of the chi-squared test can be set to a more traditional randomness pair of bounds if it is proving to be too sensitive. Adjusting the bounds for the two randomness tests would decrease false positives at the cost of true positives.

As another example, the accumulator threshold can be adjusted from 0 to another value. If this is lowered, one would expect more false positives because data with fewer random chunks would be described as random. By raising the threshold, one would expect more false negatives as fewer datasets would evaluate as random. The chunk size can also be tuned. The goal in establishing a chunk size is to have a small reliable value. Smaller values are preferable because they can be used over shorter sample sizes of data. Too large and there are more false negatives and too small yields more false positives according to empirical testing.

TABLE 1

| HTML Tested | Entire File | 4K | 2K | 1K | 512 B | 256 B |
|---|---|---|---|---|---|---|
| FP Rate | 0.05% | 0.06% | 0.08% | 0.12% | 0.14% | 0.44% |
| FN Rate | 0.77% | 0.77% | 0.77% | 0.77% | 0.77% | 0.77% |
| TP Rate (Non-HTML) | 100% | 100% | 100% | 100% | 100% | 100% |

The Table 1 shown above illustrates results of testing the algorithm described herein on sample data. Note that the scope here is to detect files with expected randomness. That is, the system did not make an effort to distinguish between, for example, encrypted verses compressed files. Nonetheless, the results are separated by file type.

For encrypted data detection, the algorithm correctly identified all known encrypted samples available for testing, 31,126 files each encrypted with RC4, and 32,689 files encrypted with AES-128-CBC (the standard AES implementation of AES in simple applications), and AES-256-CTR (the most powerful mode recognized by NIST). There were no false negatives. For fused-files, these are executables with encrypted versions of themselves added to them. Again, the algorithm detected all of them perfectly as having encrypted contents. For standard executables, out of 589 executables tested, 1 was misidentified as being random. This is a false positive rating of 0.17%. For HTML files, out of 56,646 HTML files 30 were detected as random, yielding a false positive rating of 0.05%.

In addition, the algorithm correctly identified all xz and 7-zip archives available for testing, which had been a problem point for prior testing solutions. Out of 14 zip files available for testing, only 1 was misidentified as plaintext. (Note that real files are important because zip is sensitive to the input of the algorithm, so synthetic input would skew the results away from real world performance.) This is not the case with encrypted files, for example, as these algorithms should be input agnostic.) Of 5,350 gzip files, 41 reported as plaintext, a false negative rating of 0.77%. Interestingly enough, nearly all of the false negatives were foreign language files. Like zip, gzip is extremely input-sensitive.

Figure 4:
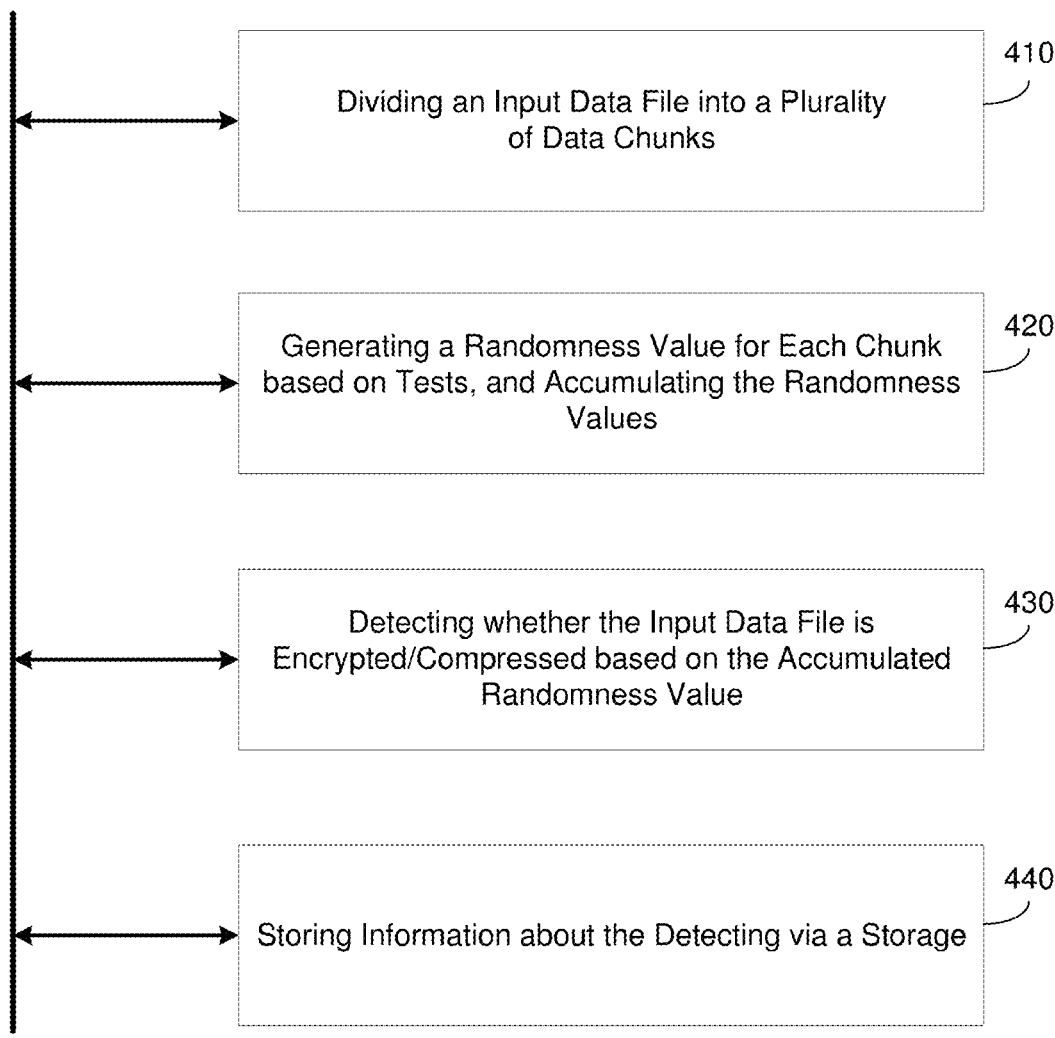
FIG. 4 is a diagram illustrating a method of detecting randomness in a data file according to example embodiments.

FIG. 4 illustrates a method 400 of detecting randomness in a data file according to example embodiments. For example, the method 400 may be performed by a web server, a user device, a cloud platform, a database, or the like. Referring to FIG. 4, in 410 the method may include receiving a data file and dividing the data file into a plurality of data chunks. The data file may include any computer-based file with any kind of data therein which may or may not be encrypted, compressed, etc. The size of the data chunks may be a statically-defined size including a predetermined number of symbols (e.g., bits, bytes, etc.).

In 420, the method may include generating a randomness value for each data chunk based on one or more predefined randomness tests, and accumulating generated randomness values of the plurality of data chunks to generate an accumulated randomness value. For example, for each data chunk, the generating may include executing a first test for randomness (e.g., M test) on the data chunk based on a multinomial distribution of the data chunk and a second test for randomness (e.g., chi-squared test) on the data chunk based on a chi-square distribution of the data chunk to generate the respective randomness value for the data chunk. If the first test for randomness identifies the data chunk as containing random data, the second test for randomness can be omitted. In some embodiments, the accumulating may include aggregating together a plurality of individually determined randomness values of the plurality of data chunks to generate the accumulated randomness value.

In 430, the method may include detecting whether the data file is one or more of encrypted and compressed based on the accumulated randomness value and a predetermined threshold value. Furthermore, in 440, the method may include storing information about the detection of the encryption/compression in a storage device. In some embodiments, the detecting may be performed in response to randomness values of a predetermined number of data chunks being accumulated. For example, a predefined number of data chunks (e.g., ten, twenty, thirty, etc.) may be accumulated before making a final determination on the data file. In some embodiments, the method may further include a larger system including the program described herein generating and outputting a notification to a user device in response to determining the data file is one or more of encrypted and compressed.

Figure 5:
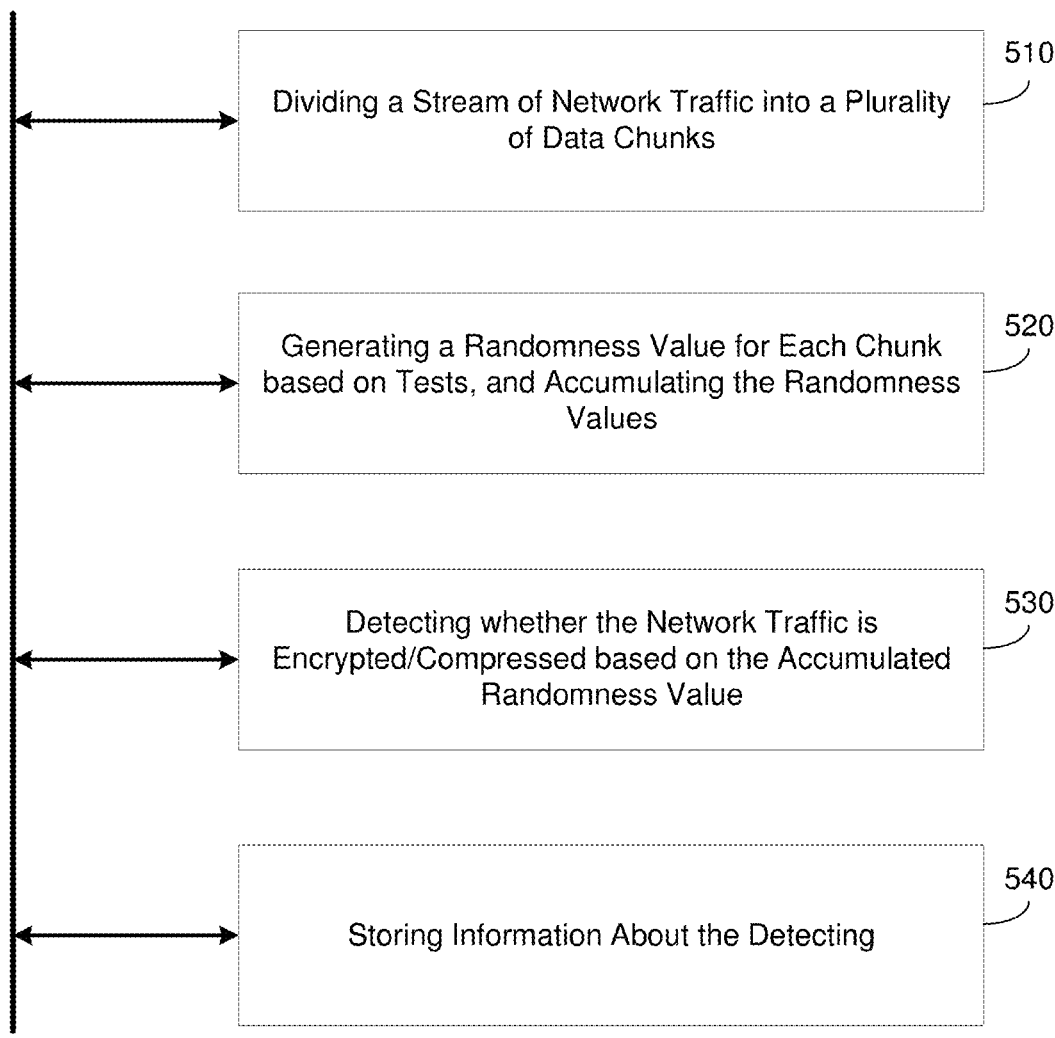
FIG. 5 is a diagram illustrating a method of detecting randomness in network traffic according to example embodiments.

FIG. 5 illustrates a method 500 of detecting randomness in network traffic according to example embodiments. For example, the network traffic may include an electronic message such as an email, a text message (SMS, MIMS, etc.), a HTTP request, and the like. Referring to FIG. 5, the method may include dividing a stream of network traffic into a plurality of data chunks. The size of the data chunks may be a statically-defined size including a predetermined number of symbols (e.g., bits, bytes, etc.). The network traffic may be communications, requests, data, etc., which is sent via the Internet between a user device (or other system) and a host platform such as a web server, or the like.

In 520, the method may include generating a randomness value for each data chunk based on one or more predefined randomness tests, and accumulating generated randomness values of the plurality of data chunks to generate an accumulated randomness value. For example, for each data chunk, the generating may include executing a first test for randomness on the data chunk based on a multinomial distribution of the data chunk and a second test for randomness on the data chunk based on a chi-square distribution of the data chunk to generate the respective randomness value for the data chunk. In some embodiments, the accumulating may include aggregating together a plurality of individually determined randomness values of the plurality of data chunks to generate the accumulated randomness value.

In 530, the method may include detecting whether the network traffic is one or more of encrypted and compressed based on the accumulated randomness value and a predetermined threshold value. Furthermore, in 540, the method may include storing information about the detection performed in 530 indicating whether the network traffic is random, encrypted, compressed, etc. In some embodiments, the randomness evaluation program described herein may be part of a larger system which can display a notification or send out an alert based on the detection of the network traffic being random. The notification may indicate that the traffic is encrypted or compressed (warning) or that the network traffic content is safe. In some embodiments, in response to detecting that the network traffic is at least one of encrypted or compressed, the system may force a termination of a communication session (network connection) with a computing system which transmitted the stream of network traffic.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
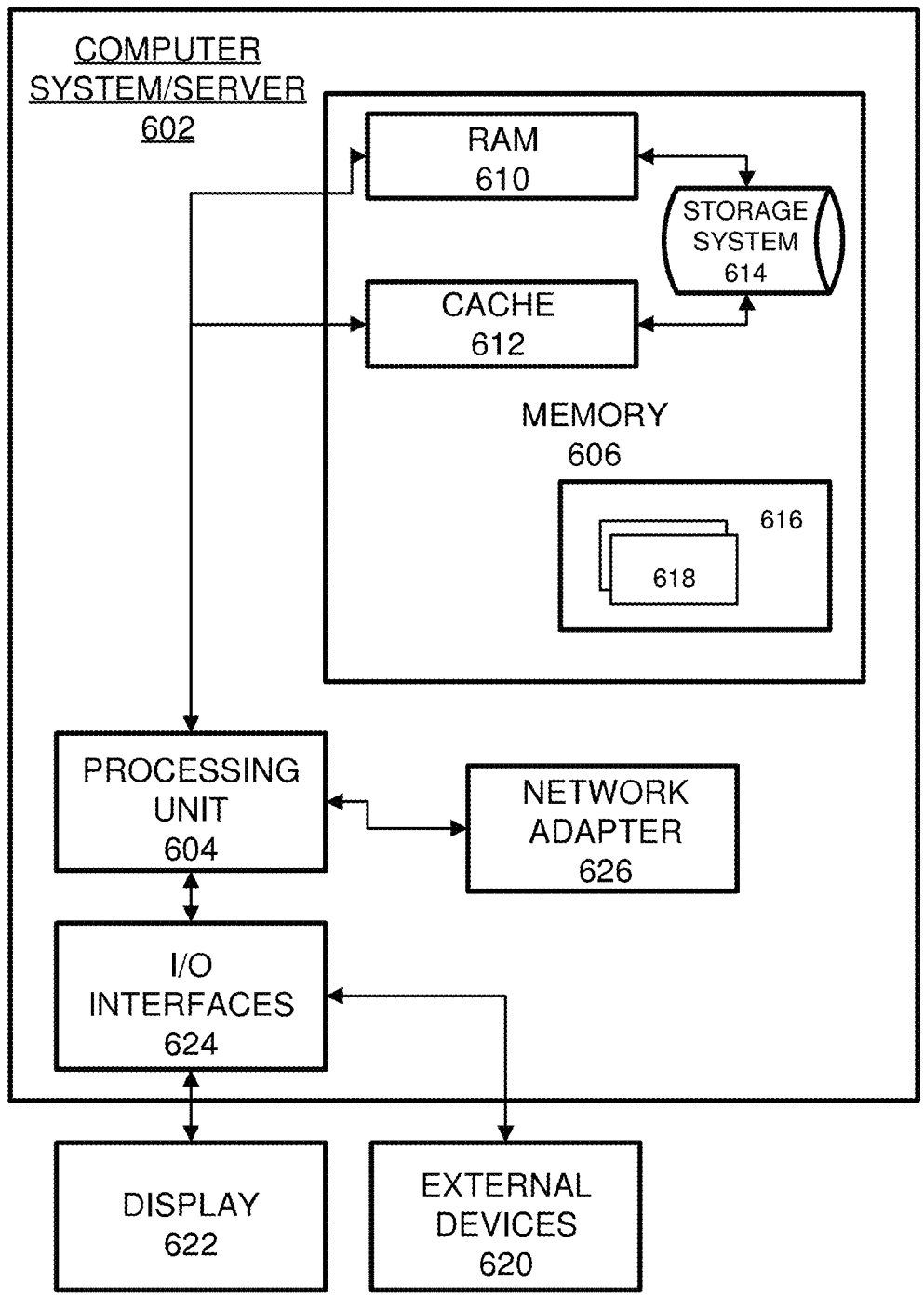
FIG. 6 is a diagram illustrating a computer system configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove. For example, the computing node 600 may be a network server of a larger enterprise network that connects multiple user workstations to the Internet, a private network, or the like.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units (processor) 604, a system memory 606, and a bus that couples various system components including the system memory 606 to the processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624 (which may be referred to herein as an output and/or an input). Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
a hardware-implemented processor that, when executing instructions stored in a memory, is configured to:
generate a first randomness value for a data chunk of a plurality of data chunks using a first randomness test, where the plurality of data chunks form a data file,
wherein when the first randomness value indicates that the data chunk is random, then the processor is further configured to:
increment a stored accumulated randomness value corresponding to the data chunk without additional randomness testing of the data chunk, and
wherein when the first randomness value does not indicate that the data chunk is random, then the processor is further configured to:
generate a second randomness value for the data chunk via a second randomness test that is different than the first randomness test,
wherein when the second randomness value indicates that the data chunk is random, then the processor is further configured to:
increment the stored accumulated randomness value corresponding to the data chunk without additional randomness testing of the data chunk,
aggregate accumulated randomness values for each data chunk of the plurality of data chunks to generate an aggregated randomness value, and
identify the data file as random or not random based on a comparison of the aggregated randomness value to a predetermined threshold value.

2. The computing system of claim 1, wherein the plurality of data chunks have a predefined size.

3. The computing system of claim 1, wherein the processor is configured to:
detect whether the data file is one or more of encrypted or compressed based on the randomness value and the predetermined threshold value.

4. The computing system of claim 1, wherein each data chunk of the plurality of data chunks has a same size.

5. The computing system of claim 1, wherein, when the processor identifies the data file as random or not random, the processor is further configured to:
detect whether the data file is one or more of encrypted or compressed based on the randomness value and the predetermined threshold value.

6. A method comprising:
generating, by a hardware-implemented processor, a first randomness value for a data chunk of a plurality of data chunks using a multinomial distribution randomness test, wherein the plurality of data chunks form a data file;
wherein when the first randomness value indicates that the data chunk is random, then the method further comprises:
incrementing a stored accumulated randomness value corresponding to the data chunk without additional randomness testing of the data chunk, and
wherein when the first randomness value does not indicate that the data chunk is random, then the method further comprises:
generating a second randomness value for the data chunk via a second randomness test that is different than the first randomness test,
wherein when the second randomness value indicates that the data chunk is random, then the method further comprises:
incrementing the stored accumulated randomness value corresponding to the data chunk without additional randomness testing of the data chunk,
aggregating, by the hardware-implemented processor, accumulated randomness values for each data chunk of the plurality of data chunks to generate an aggregated randomness value, and
identify, by the hardware-implemented processor, the data file as random or not random based on a comparison of the aggregated randomness value to a threshold value.

7. The method of claim 6, wherein the plurality of data chunks have a predefined size.

8. The method of claim 6, comprising,
detecting whether the data file is one or more of encrypted or compressed based on the randomness value and a predetermined threshold value.

9. The method of claim 6, wherein each data chunk of the plurality of data chunks has a same size.

10. The method of claim 6, wherein the identifying the data file as random or not random further comprises:

detecting whether the data file is one or more of encrypted or compressed based on the randomness value and the predetermined threshold value.

11. A computing system comprising:
a hardware-implemented processor that, when executing instructions stored in a memory, is configured to:
generate a first randomness value fora data chunk of a plurality of data chunks using a multinomial distribution randomness test, wherein the plurality of data chunks form a stream of network traffic,
wherein when the first randomness value indicates that the data chunk is random, then the processor is further configured to:
increment a stored accumulated randomness value corresponding to the data chunk without additional randomness testing of the data chunk, and
wherein when the first randomness value does not indicate that the data chunk is random, then the processor is further configured to:
generate a second randomness value for the data chunk via a second randomness test that is different than the first randomness test,
wherein when the second randomness value indicates that the data chunk is random, then the processor is further configured to:
increment the stored accumulated randomness value corresponding to the data chunk without additional randomness testing of the data chunk,
aggregate accumulated randomness values for each data chunk of the plurality of data chunks to generate an aggregated randomness value, and
identify the stream of network traffic as random or not random based on a comparison of the aggregated randomness value to a threshold value.

12. The computing system of claim 11, wherein the plurality of data chunks have a predefined size.

13. The computing system of claim 11, wherein the processor is configured to:
detect whether the stream of network traffic is one or more of encrypted or compressed based on the randomness value and a predetermined threshold value.

14. The computing system of claim 11, wherein the processor is configured to:
terminate a session with a user device that generated the network traffic in response to detecting the network traffic is one or more of compressed or encrypted.

15. A method comprising:
generating, by a hardware-implemented processor, a first randomness value fora data chunk of a plurality of data chunks using a multinomial distribution randomness test, wherein the plurality of data chunks form a stream of network traffic,
wherein when the first randomness value indicates that the data chunk is random, the method further comprises:
incrementing a stored accumulated randomness value corresponding to the data chunk without additional randomness testing of the data chunk, and
wherein when the first randomness value does not indicate that the data chunk is random, then the method configured comprises:
generating a second randomness value for the data chunk via a second randomness test that is different than the first randomness test,
wherein when the second randomness value indicates that the data chunk is random, then the method further comprises:
incrementing the stored accumulated randomness value corresponding to the data chunk without additional randomness testing of the data chunk,
aggregating, by the hardware-implemented processor, accumulated randomness values for each data chunk of the plurality of data chunks to generate an aggregated randomness value, and
identifying, by the hardware-implemented processor, the stream of network t raffic as random or not random based on a comparison of the aggregated randomness value to a threshold value.

16. The method of claim 15, wherein the plurality of data chunks have a predefined size.

17. The method of claim 15, comprising:
detect whether the stream of network traffic is one or more of encrypted or compressed based on the randomness value and a predetermined threshold value.

18. The method of claim 15, comprising,
terminating a session with a user device that generated the network traffic in response to detecting the network traffic is one or more of compressed or encrypted.

19. A non-transitory computer-readable medium comprising instructions that, when executed by a processor, cause the processor to perform:
generating a first randomness value for a data chunk of a plurality of data chunks using a multinomial distribution randomness test, wherein the plurality of data chunks form a stream of network traffic,
wherein when the first randomness value indicates that the data chunk is random, the instructions further cause the processor to perform:
incrementing a stored accumulated randomness value corresponding to the data chunk without additional randomness testing of the data chunk, and
wherein when the first randomness value does not indicate that the data chunk is random, then the method configured comprises:
generating a second randomness value for the data chunk via a second randomness test that is different than the first randomness test,
wherein when the second randomness value indicates that the data chunk is random, then the instructions further cause the processor to perform:
incrementing the stored accumulated randomness value corresponding to the data chunk without additional randomness testing of the data chunk,
aggregating accumulated randomness values for each data chunk of the plurality of data chunks to generate an aggregated randomness value, and
identifying the stream of network traffic as random or not random based on a comparison of the aggregated randomness value to a threshold value.

20. The non-transitory computer-readable medium of claim 19, wherein the plurality of data chunks have a predefined size.

21. The non-transitory computer-readable medium of claim 19, wherein the instructions further cause the processor to perform:
detecting whether the data file is one or more of encrypted or compressed based on the randomness value and a predetermined threshold value.

* * * * *